(12) United States Patent
Tung

(10) Patent No.: US 7,540,208 B2
(45) Date of Patent: Jun. 2, 2009

(54) RECIPROCAL FORCE OUTPUTTING MECHANISM

(76) Inventor: Tien-Chen Tung, 13F., No. 164, Sec. 2, Keelung Rd., Sinyi District, Taipei City 110 (TW)

( * ) Notice: Subject to any disclaimer, the term of this patent is extended or adjusted under 35 U.S.C. 154(b) by 733 days.

(21) Appl. No.: 11/130,099

(22) Filed: May 17, 2005

(65) Prior Publication Data
US 2006/0207358 A1    Sep. 21, 2006

(30) Foreign Application Priority Data
Mar. 17, 2005    (TW)    .............................. 94204146 U

(51) Int. Cl.
*F16H 21/18*    (2006.01)
(52) U.S. Cl. ............................................. 74/50; 92/136
(58) Field of Classification Search .................... 74/25, 74/29, 30, 32, 50, 112, 84 R, 132; 92/136; 417/534
See application file for complete search history.

(56) References Cited
U.S. PATENT DOCUMENTS

| | | | | |
|---|---|---|---|---|
| 823,341 A | * | 6/1906 | Livingston | ...................... 74/32 |
| 1,362,901 A | * | 12/1920 | Simonton | ...................... 74/32 |
| 1,601,188 A | * | 9/1926 | Nagel | .............................. 74/32 |
| 4,065,032 A | * | 12/1977 | Lydiksen | ...................... 222/77 |
| 4,561,592 A | * | 12/1985 | Fender et al. | ............. 239/587.5 |
| 4,872,360 A | * | 10/1989 | Lew et al. | ...................... 74/110 |
| 5,076,090 A | * | 12/1991 | Cetnarowski | ................. 72/407 |
| 5,385,218 A | * | 1/1995 | Migliori | ...................... 188/303 |
| 5,492,535 A | * | 2/1996 | Reed et al. | ................... 604/152 |
| 5,528,946 A | * | 6/1996 | Yadegar | .......................... 74/31 |
| 5,992,253 A | * | 11/1999 | Petersen | ....................... 74/132 |
| 6,068,448 A | * | 5/2000 | Muratsubaki et al. | ....... 417/44.2 |
| 6,789,439 B2 | * | 9/2004 | Tung | .............................. 74/32 |
| 6,910,409 B2 | * | 6/2005 | Yamamoto | .................... 92/136 |

* cited by examiner

*Primary Examiner*—Richard W L Ridley
*Assistant Examiner*—Matthew Johnson

(57) ABSTRACT

A reciprocal force outputting mechanism includes a main body and a power component combined therewith; the main body includes a slide slot and two compression passages communicated with the slot; a slide block is accepted in the slide slot; a stem is accepted in each of the two compression passages, one end of each stem is combined to one flank side of the slide block; the slide block can be driven to move to and fro to allow the two stems to be moved reciprocally to respectively output a push force to enhance the working efficiency.

3 Claims, 5 Drawing Sheets

RECIPROCAL FORCE OUTPUTTING MECHANISM

FIELD OF THE INVENTION

The present invention relates to a reciprocal force outputting mechanism, and more particularly to a force outputting mechanism capable of generating a linear and reciprocal movement.

DESCRIPTION OF RELATED ART

Please refer to FIGS. 1A and 1B. U.S. Pat. No. 6,789,439 discloses a reciprocal force outputting mechanism, in which a fan-shaped gear 22 is driven to rotate when a power output shaft 21 that serves as a power component is revolved. As FIG. 1A shows, a slide block 11 and stem 112 is moved to the left of the figure when teeth 221 of the fan-shaped gear 22 are engaged with a denticulate row 111 of the slide block 11. As FIG. 1B shows, the slide block 11 and the stem 112 is moved to the right of the figure when teeth 221 are engaged with a denticulate row 113 of the slide block 11. The rotation of the fan-shaped gear 22 can drive the stem 112 to process a reciprocal, linear motion to be used as a power output. The slide block 11 is placed in a slide slot 12 of a base 10.

Power can be output only when the stem of the reciprocal force outputting mechanism mentioned above is moved toward one side; a push force can merely be output discontinuously so that the efficiency is low.

SUMMARY OF THE INVENTION

For improving the reciprocal force outputting mechanism mentioned above, allowing a push force to be output no matter what the slide block is moved leftward or rightward, a continuous output push force can be generated so that the present invention is proposed.

The main object of the present invention is to provide a reciprocal force outputting mechanism, capable of generating a continuous push fore output to enhance the work efficiency.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1A:
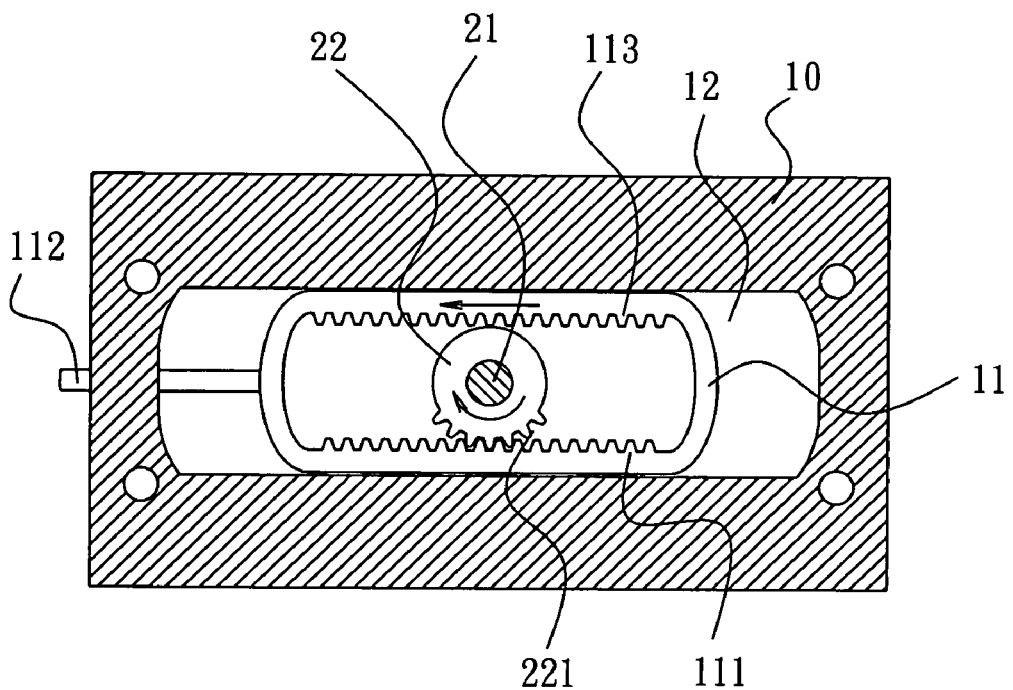
FIGS. 1A and 1B are schematic views, showing a conventional reciprocal force outputting mechanism.
Figure 1B:
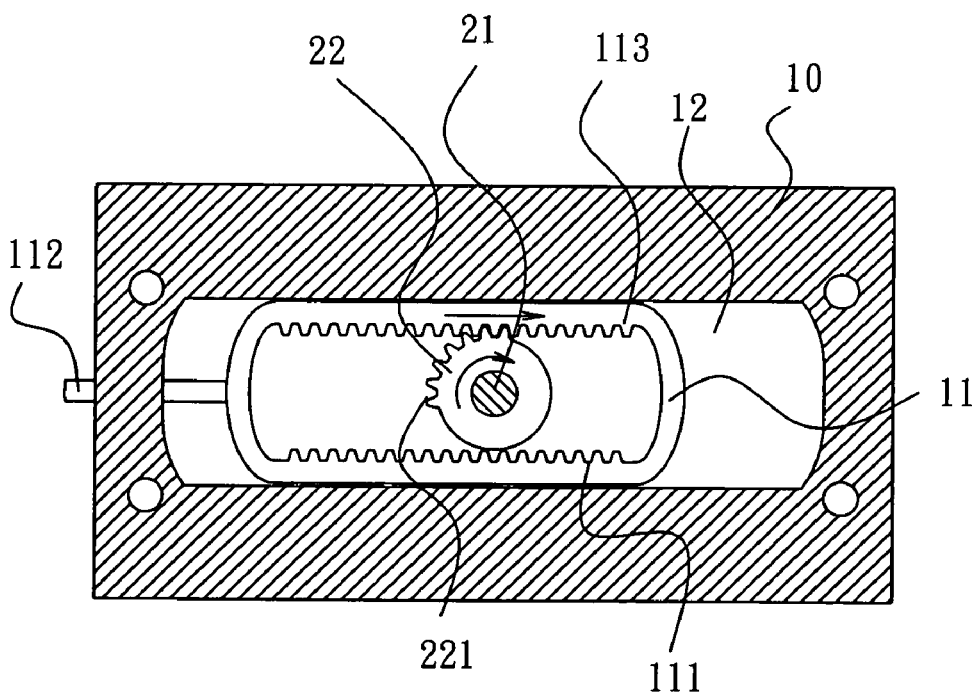
Figure 2:
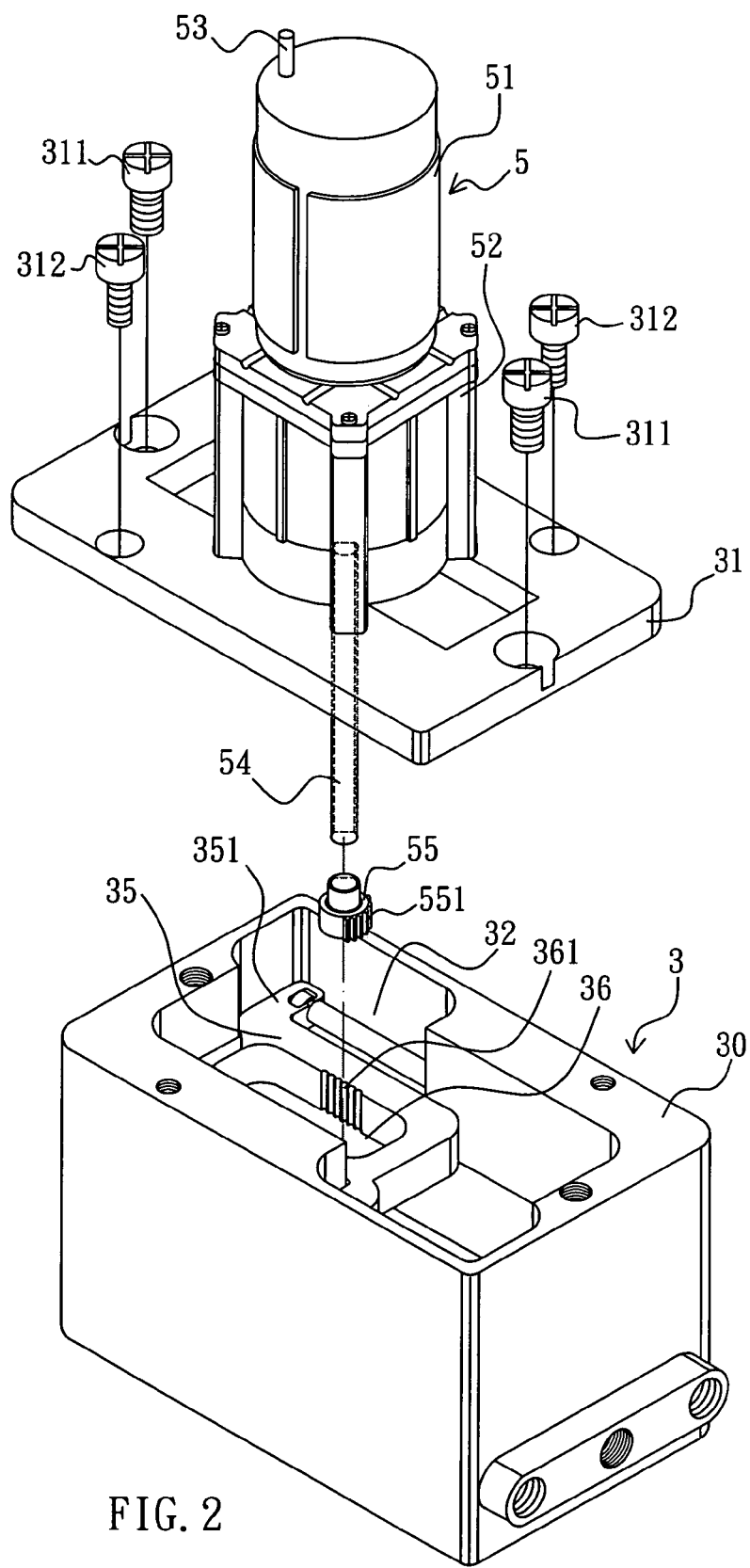
FIG. 2 is a partly explosive view of the present invention.
Figure 3:
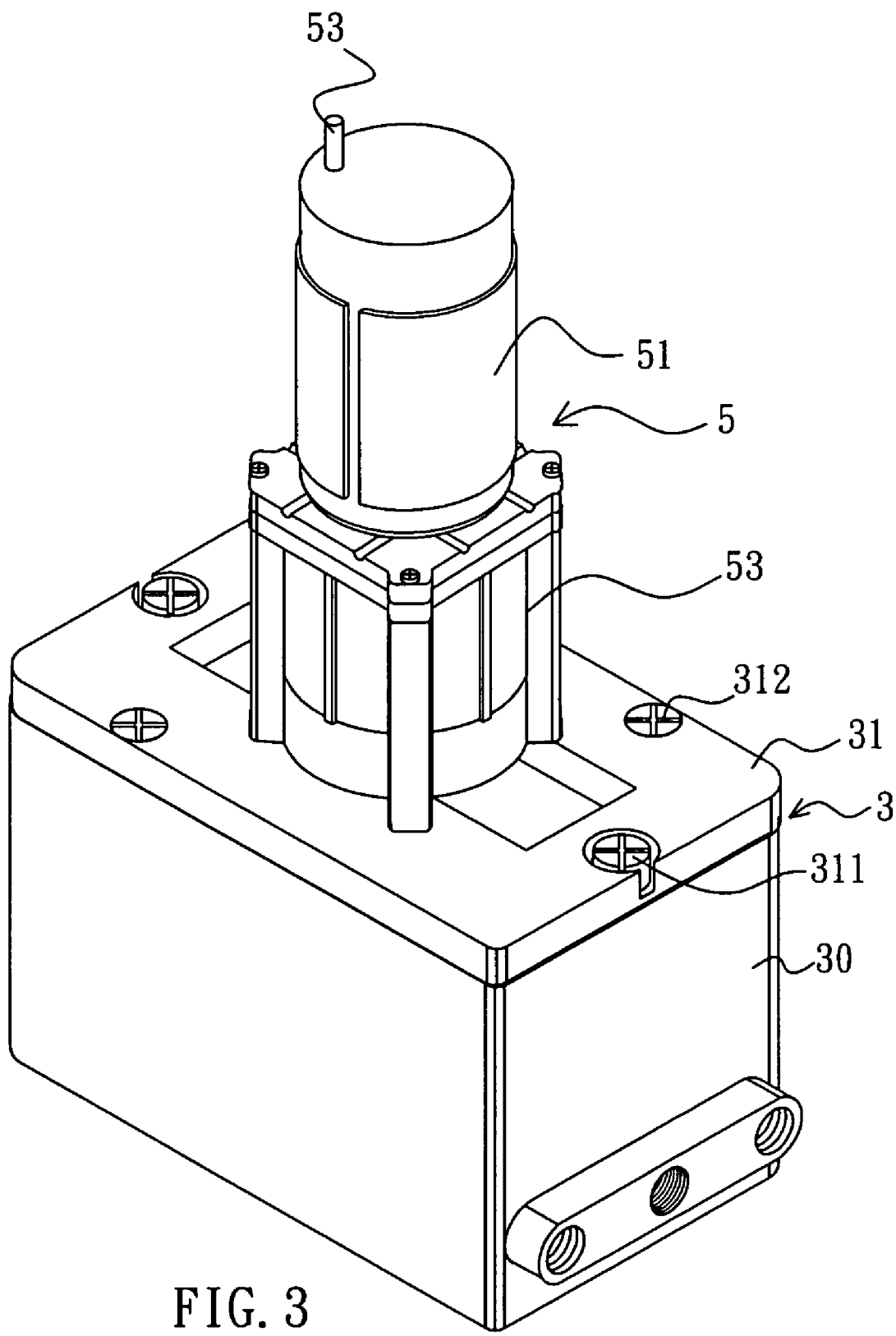
FIG. 3 is a prospective view of the present invention.
Figure 4A:
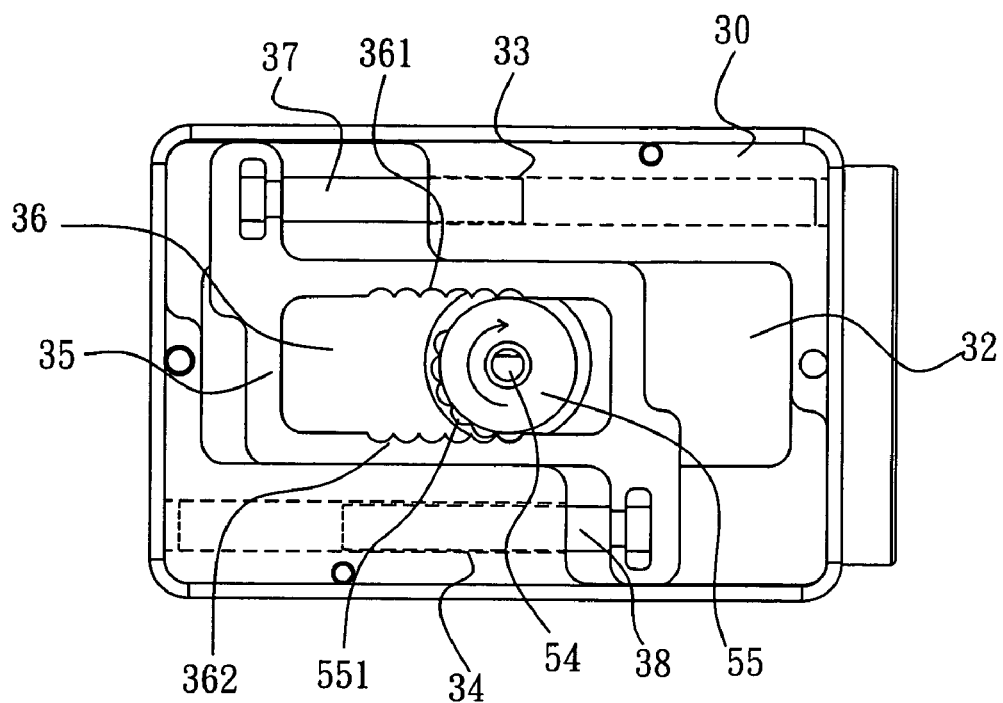
FIGS. 4A and 4B are schematic views, showing an operation of the present invention.
Figure 4B:
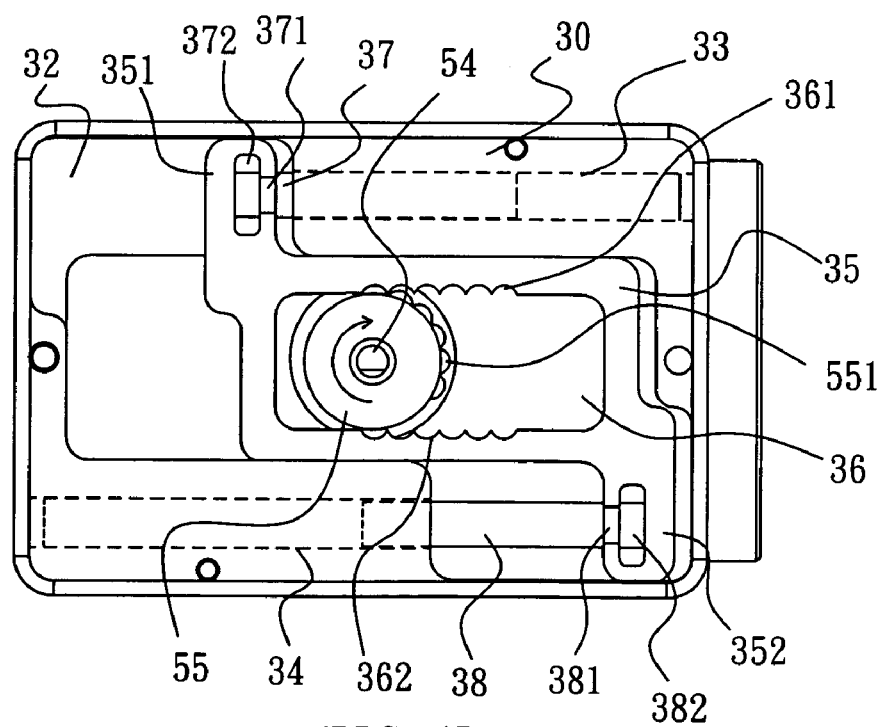

Please refer to FIGS. 2, 3, 4A and 4B. A reciprocal force outputting mechanism comprises a main body 3 and a power component 5 combined therewith. The main body 3 comprises a base 30 and a upper cover 31 combined therewith. The upper cover 31 is fixed on the base 30 with a plurality of screws 311 and 312. The power component comprises a motor (or pneumatic mechanism) 51 and a gear train 52; the gear train 52 is combined with the upper cover 31 on the upper side thereof. The motor 51 is connected to a battery, AC power supply or DC power supply (or air compressor) through wires (or conduits) 53. The rotating shaft of the motor 51 is connected to the gear train 52. A power output shaft 54 of the gear train 52 is passed through the center hole of a fan-shaped gear 55 and then pivotally connected in a corresponding hole in the slide slot 32 of the base 30; the power output shaft 54 is fixedly combined with the fan-shaped gear 55 to drive the fan-shaped gear 55 to rotate. The slide slot 32 and two compression passages 33 and 34 combined with the slide slot 32 of the base 30 is disposed at the lower end of the upper cover 31, as FIGS. 4A and 4B show. A slide block 35 is accepted in the slide slot 32. Raised portions 351 and 352 are disposed at the different ends of the two flank sides of the sliding block 35. The slide block 35 has a rectangular hole 36 and the fan-shaped gear 55 is placed in the rectangular hole 36. Denticulate rows 361 and 362 respectively disposed at the two relative sides of the rectangular hole 36 in the slide slot 35 are respectively engaged with teeth 551 of the fan-shaped gear 55. Stems 37 and 38 are respectively accepted in the compression passages 33 and 34. Neck portions 371, 381 and cap portions 372, 382 are respectively at one end of the stem 37 and one end of the stem 38. Accepting grooves corresponding to the neck portions 371, 381 and the cap portions 372, 382 are respectively disposed at the two raised portions 351, 352 for respectively accepting the neck portions 371, 381 and the cap portions 372, 382 to allow the raised portions 351, 352 to be respectively combined with the stems 37, 38 to drive the stems 37, 38 to move to and fro.

Figure 5A:
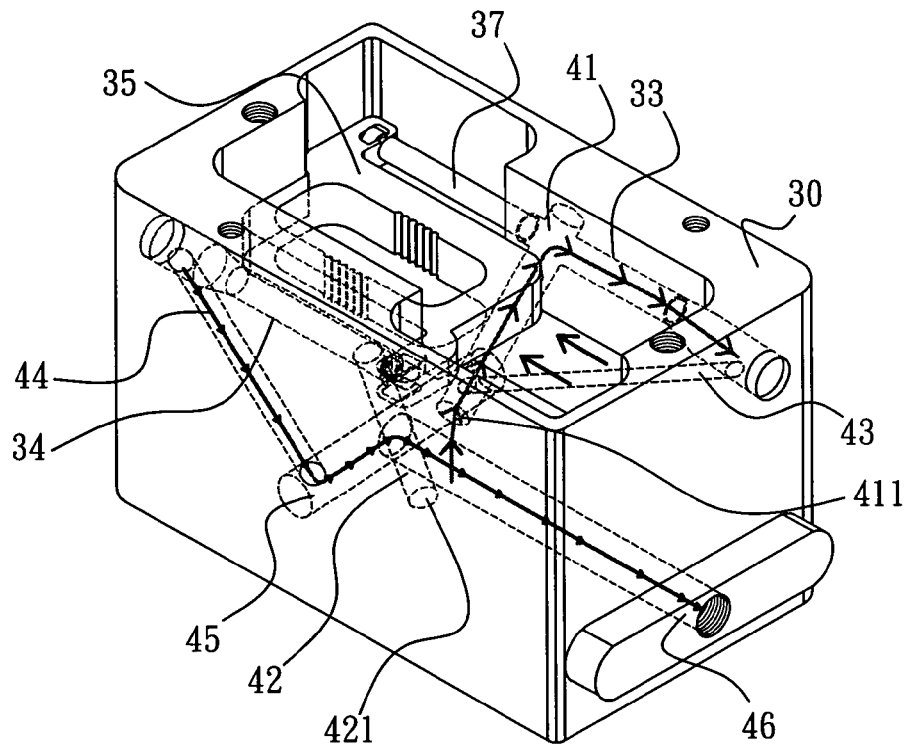
FIGS. 5A and 5B are schematic views, showing an operation of a preferred embodiment of the present invention.
Figure 5B:
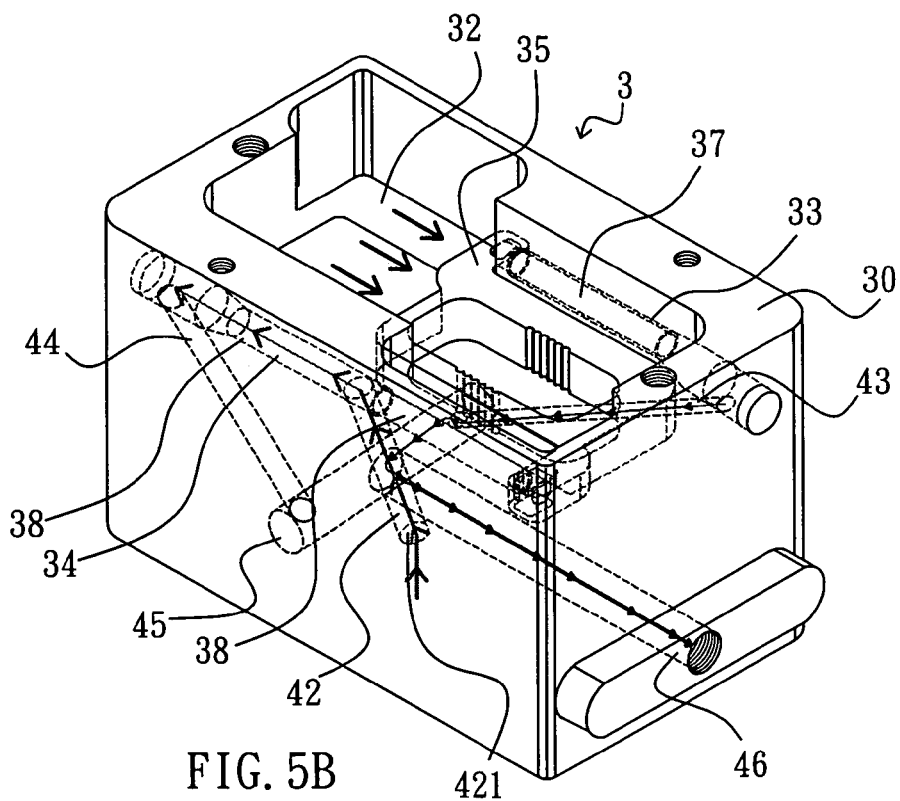

Please refer to FIGS. 4A, 4B, 5A and 5B. When the present invention is took into practice, a grease output mechanism is combined at the lower end of the main body 3, and two reciprocally moved stems 37 and 38 are used as a power for causing grease to output. The base 30 of the embodiment further comprises two first passages 41 and 42, two second passages 43 and 44, a third passage 45 and a fourth passage 46, As FIG. 5A shows. Opening ends 411 and 421 of the first passages 41 and 42 are respectively communicated with the grease input mechanism and another ends thereof are respectively communicated with the two compression passages 33 and 34 close to the front ends of the strokes of the stems 37 and 38. Ends of the second passages 43 and 44 are respectively communicated with the two compression passages 33 and 34 close to the rear ends of the strokes of the stems 37 and 38; other ends thereof are respectively communicated with the third passages 45. The third passages 45 and is further communicated with the fourth passage 46. Please refer to FIGS. 4A and 5A again. When the power output shaft 54 drives the fan-shaped gear 55 to rotate, the slide block 35 can be driven to move to the left of the figures if the teeth 551 are engaged with the rack 362, the grease enters the first passage 41 and the compression passage 33 through the opening end 411 of the first passage 41 and the stem 38 concurrently pushes the grease in the compression passage 34 into the second passage 44 and the grease is then to be expelled out of the base 30 through the third passage 45 and the fourth passage 46. Please refer to FIGS. 4B and 5B again. When the power output shaft 54 drives the fan-shaped gear 55 to rotate, the slide block 35 can be driven to move to the right of the figures if the teeth 551 are engaged with the rack 361, the grease enters the first passage 42 and the compression passage 34 through the opening end 421 of the first passage 42 and the stem 37 concurrently pushes the grease in the compression passage 33 into the second passage 43 and the grease is then to be expelled out of the base 30 through the third passage 45 and the fourth passage 46.

The design that the two sides of the slide block 35 are respectively combined with the stems 37 and 38 according to the present invention is used to allow the grease in the compression passages 33 and 34 to be pushed to output out of the base 30 by means of the push force of either the stem 37 or 38 when the slide block 35 is moved leftward or rightward so that the grease can be output continuously. The reciprocal force outputting mechanism according to the present invention can output two times of the amount of the grease compared to the conventional one so that the grease outputting efficiency can be enhanced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A reciprocal force outputting mechanism, comprising a main body and a power component combined therewith; said main body comprising a slide slot and two compression passages communicated with said slot; a slide block being accepted in said slide slot; a rectangular hole being disposed in the middle of said slide block and a row of teeth being disposed at each of two opposite sides of said rectangular hole; a stem being accepted in each of the two compression passages, one end of each stem being combined to one flank side of said slide block; a power output shaft of said power component being passed through a center hole of a gear and pivotally connected to a hole in a base of said main body; said power output shaft being fixedly combined with said gear; said gear being positioned in said rectangular hole, wherein the slide block can be driven to move to and fro to allow said two stems to be moved reciprocally to respectively output a push force if the teeth of said are engaged with one of said two opposite rows of teeth when said power output shaft is driven by said gear to rotate, wherein two first passages, two second passages, a third passage and a fourth passage being further disposed in said base; one end of each first passage being an open end so as to be communicated with a grease outputting mechanism, another end thereof being communicated with one of said two compression passages; one end of each second passage being communicated to one of said two compression passages, another end thereof being communicated with said third passage; said third passage being further communicated with said fourth passage.

2. The reciprocal force outputting mechanism according to claim 1, wherein two raised portions are respectively disposed at different ends of two sides of said slide block, a neck portion and cap portion are disposed at one end of each stem, said two raised portions respectively have accepting grooves corresponding to said neck portions and said cap portion; wherein said neck portion and cap portion can respectively be accepted in said grooves to allow said two raised portions to be combined respectively with said stems.

3. The reciprocal force outputting mechanism according to claim 1, wherein said base is combined with an upper cover and said power component is combined to the upper side of said upper cover.

* * * * *